United States Patent [19]

Murakawa et al.

[11] Patent Number: 5,260,238
[45] Date of Patent: Nov. 9, 1993

[54] PROCESS FOR REGENERATING A DEACTIVATED CATALYST

[75] Inventors: Takashi Murakawa; Michio Sugimoto, both of Sodegaura, Japan

[73] Assignee: Idemitsu Kosan Co., Ltd., Tokyo, Japan

[21] Appl. No.: 951,454

[22] Filed: Sep. 25, 1992

[30] Foreign Application Priority Data

Oct. 3, 1991 [JP] Japan .................... 3-256198

[51] Int. Cl.$^5$ .......... B01J 29/38; B01J 38/66; B01J 38/60; C10G 35/095
[52] U.S. Cl. .................... 502/26; 208/140; 502/27; 502/32; 502/36; 502/37
[58] Field of Search .......... 502/22, 26, 27, 36, 502/37; 208/140

[56] References Cited

U.S. PATENT DOCUMENTS

| | | | |
|---|---|---|---|
| 3,998,755 | 12/1976 | Hayes | 208/140 |
| 4,104,320 | 8/1978 | Bernard et al. | 208/138 |
| 4,417,083 | 11/1983 | Bernard et al. | 585/419 |
| 4,448,891 | 5/1984 | Cohen | 502/74 |
| 4,456,527 | 6/1984 | Buss et al. | 208/89 |
| 4,493,901 | 1/1985 | Bernard et al. | 502/37 |
| 4,544,539 | 10/1985 | Wortel | 423/328 |
| 4,556,646 | 12/1985 | Bezman | 502/66 |
| 4,594,145 | 6/1986 | Roarty | 207/79 |
| 4,595,669 | 6/1986 | Fung | 502/74 |
| 4,595,670 | 6/1986 | Tauster et al. | 502/74 |
| 4,648,961 | 3/1987 | Jacobson et al. | 208/138 |
| 4,677,236 | 6/1987 | Wortel | 585/419 |
| 4,678,764 | 7/1987 | Le et al. | 502/26 |
| 4,701,315 | 10/1987 | Wortel | 423/328 |
| 4,810,683 | 3/1989 | Cohn et al. | 502/37 |
| 4,826,792 | 5/1989 | Le et al. | 502/26 |
| 4,855,269 | 8/1989 | Mohr | 502/37 |
| 4,925,819 | 5/1990 | Fung et al. | 502/37 |
| 4,937,215 | 6/1990 | Murakawa et al. | 502/37 |
| 5,051,387 | 9/1991 | Koetsier et al. | 502/74 |
| 5,155,074 | 10/1992 | Mohr | 502/37 |

*Primary Examiner*—Paul E. Konopka
*Attorney, Agent, or Firm*—Frishauf, Holtz, Goodman & Woodward

[57] ABSTRACT

There is disclosed a process for regenerating a deactivated catalyst containing a zeolite and a noble metal of group VIII of the Periodic Table supported thereon which comprises subjecting the deactivated catalyst to decoking treatment under reductive or oxidative condition and subsequently to contact treatment with a solution containing a halogen or a halogen-containing compound and thereafter calcining the deactivated catalyst. According to the above process, the catalytic activity of a deactivated catalyst is restored to the level comparable to that of a fresh catalyst by the use of an inexpensive regenerating agent and simplified steps. Thus, the regeneration process is expected to find effective use in petroleum refinery, petrochemical industry, etc.

18 Claims, No Drawings

PROCESS FOR REGENERATING A DEACTIVATED CATALYST

BACKGROUND OF THE INVENTION

1. Field of the Invention

The present invention relates to a process for regenerating a deactivated catalyst. More particularly, it pertains to a process for efficiently regenerating a deactivated catalyst comprising a zeolite and a noble metal of the group VIII of the Periodic Table supported thereon, especially the catalyst for the production of aromatic compounds.

2. Description of Related Art

It has heretofore been known that a variety of catalysts such as a zeolite with a noble metal of the group VIII of the Periodic Table exemplified by platinum supported thereon are effective for the production of aromatic compounds. However, these catalysts are deactivated by the accumulation of coke on the noble metal during a long-term reaction and no longer function satisfactorily as catalyst, thereby necessitating regeneration of themselves at an appropriate interval. It is familiar to one with ordinary skill in the art that the coke accumulated on a deactivated catalyst such as platinum supported on L-type zeolite can be removed by heating it to a temperature in the range of 430° to 540° C. in the presence of diluted oxygen. Nevertheless, this decoking of the catalyst at such a high temperature brings about the growth of the supported noble metal particles, that is, a decrease in the surface area of the particles, thereby resulting in a decrease in the catalytic activity. It is necessary, therefore, that after the high temperature decoking the catalyst be brought into contact with air with chlorine or a chlorine compound such as carbon tetrachloride at an elevated temperature (oxychlorination treatment) to redisperse the noble metal particles (refer to Japanese Patent Application Laid-Open No. 168540/1985 and Japanese Patent Publication No. 24585/1990).

However, it is extremely difficult to regenerate a catalyst poisoned with sulfur or a heavily deactivated catalyst even by the above-mentioned oxychlorination treatment.

There is also disclosed a process for regenerating a deactivate catalyst comprising the steps of decoking a deactivated catalyst under an oxidative condition; washing it with a neutral or an acidic solution; treating it with an aqueous basic solution; washing it with deionized water; drying it and calcining (International Patent Publication No. 500710/1987). However, the aforesaid process is poor in regeneration efficiency, entails too many steps and requires aqueous solution at least 10 times the catalyst volume.

There are further disclosed a technique by regenerating a deactivated catalyst only by hydrogen reduction treatment (Japanese Patent Application Laid-Open No. 24316/1982) and a technique by regenerating a deactivated catalyst by decoking the same in the presence of a halogen-containing compound (Japanese Patent Application Laid-Open No. 231944/1989). Nevertheless, the regenerated catalyst in the former is inferior in catalytic performance, whereas the regeneration process in the latter suffers the disadvantages that the decoking at a high temperature in the presence of a halogen-containing compound leads to expensive treatment equipment and a hydrochlorofluorocarbon gas used therein as the above compound will unfavorably cause environmental destruction which has become a serious problem in recent years.

Under such circumstances facing the above-mentioned difficulties, intensive research and investigation were concentrated by the present inventors on the development of a process for regenerating a deactivated catalyst that is capable of overcoming the disadvantages of the aforesaid prior arts, facilitating the regeneration of the catalyst deactivated by coke accumulation or sulfur poison or the heavily deactivated catalyst and thus restoring the catalytic activity thereof to the extent comparable to that of a fresh catalyst.

As a result, it has been found by the present inventors that the above-mentioned problems are overcome and the effective regeneration of a deactivated catalyst is attained by decoking the deactivated catalyst and thereafter treating the same with a solution containing a halogen or a halogen-containing compound. The present invention has been accomplished on the basis of the above-mentioned finding and information.

SUMMARY OF THE INVENTION

It is a general object of the present invention to provide a process for efficiently regenerating a deactivated catalyst comprising a zeolite and a noble metal of the group VIII of the Periodic Table supported thereon.

It is another object of the present invention to provide a process for regenerating the deactivated catalyst free from environmental pollution or destruction.

It is still another object of the present invention to provide a process for restoring the catalytic activity of the deactivated catalyst to the extent comparable to that of a fresh catalyst.

It is a further object of the present invention to provide a process for regenerating the deactivated catalyst with the minimized number of treatment steps and an inexpensive non-hazardous regenerating agent.

Other objects of the present invention will become apparent from the detailed description to follow taken in conjunction with the appended claims.

For the above-mentioned objects, the present invention provides a process for regenerating a deactivated catalyst comprising a zeolite and a noble metal of group VIII of the Periodic Table supported thereon which comprises subjecting said deactivated catalyst to decoking treatment under a reductive or an oxidative condition and subsequently to a contact treatment with a solution containing a halogen or a halogen-containing compound and thereafter calcining said catalyst.

DESCRIPTION OF PREFERRED EMBODIMENT

Catalysts to which is applicable the process of the present invention include a deactivated catalyst for the production of an aromatic compound, which catalyst comprises a zeolite with a noble metal of group VIII of the Periodic Table supported thereon. The zeolite may be synthetic or natural zeolite and may be any of X-type, Y-type, L-type, Mordenite type, ZSM-5-type and so forth, but is particularly desirably L-type. The metal to be supported on the zeolite is selected from the noble metals of group VIII of the Periodic Table exemplified by Os, Ru, Rh, Ir, Pd and Pt, of which Pt is particularly desirable. The catalyst may contain Re, Sn, Ge or the like as the secondary metallic component to be supported on the zeolite, which may be made into formed particles, e.g., pellets, extrades, balls, or the like, with an inorganic binder such as alumina, silica, silica-alumina, or clay.

Examples of the catalysts that are the objects of the process according to the present invention include an extremely wide range of the catalyst, for example, those disclosed in Japanese Patent Application Laid-Open Nos. 33632/1977, 24316/1982, 133835/1983, 134035/1983, 223614/1983, 80333/1984, 179589/1984, 15489/1985, 168539/1985, 175548/1985, 60787/1986, 125437/1986, 148296/1986, 151019/1986 and 57653/1987.

The above-disclosed catalysts are employed in the production of aromatic compounds and are effective for the reactions of producing benzene from light naphtha, an alkylbenzene from heavy naphtha, high octane gasoline from heavy naphtha or the like. When any of the aforementioned catalysts is used in the reaction as described above for a long period of time it is inevitably deactivated by the accumulation of coke on the surface thereof.

In accordance with the process of the present invention, the catalyst thus deactivated is regenerated by subjecting the deactivated catalyst to decoking treatment under reductive or oxidative condition and subsequently to contact treatment with a solution containing a halogen or a halogen-containing compound, so called "liquid phase halogen contact treatment" and thereafter calcining the catalyst thus treated.

The decoking treatment under a reductive condition may be carried out by any of various methods under the treatment conditions, for example in the case of hydrogen being used, including a treatment temperature of usually 200° to 600° C., preferably 300° to 550° C., a treatment time of 1 to 50 hours, preferably 10 to 30 hours, and a treatment pressure of 0 to 20 kg/cm²G, preferably 0 to 10 kg/cm²G. Likewise, the decoking treatment under an oxidative condition may be put into practice by any of a variety of methods under the treatment conditions, for instance in the case of oxygen being employed, including a treatment temperature of ordinarily 100° to 600° C., preferably 100° to 550° C., a treatment time of 1 to 48 hours, preferably 2 to 30 hours, and a treatment pressure of 0 to 20 kg/cm²G, preferably 0 to 10 kg/cm²G.

In accordance with the process of the present invention, the above-mentioned decoking treatment of the deactivated catalyst is followed by a liquid phase halogen contact treatment, which is carried out by bringing the above catalyst into contact with a solution of a halogen or a halogen-containing compound in water in an amount which counterbalances the moisture of the catalyst. As the contact method, mention may be made of atmospheric-pressure impregnation method, vacuum impregnation method, osmosis or permeation method or the like.

Examples of the above-mentioned halogen and halogen-containing compound include bromine, hydrogen chloride, ammonium chloride, hydrogen fluoride, ammonium fluoride, hydrogen bromide, ammonium bromide, hydrogen iodide and ammonium iodide, among which are particularly desirable hydrogen chloride, ammonium chloride and ammonium fluoride. The halogen or halogen-containing compound may be used alone or in combination with at least one of them to form a mixture.

The content of the halogen or halogen-containing compound in the catalyst subjected to liquid phase halogen contact treatment in the above manner is not specifically limited but is usually 0.1 to 10% by weight, preferably 0.5 to 5% by weight based on the catalyst.

The aforesaid calcining treatment of the catalyst thus treated is put into practice in the presence of oxygen under the conditions including a treatment temperature of usually 100° to 600° C., preferably 200° to 500° C., a treatment time of 0.5 to 24 hours, preferably 1 to 10 hours and a treatment pressure of 0 to 20 kg/cm²G, preferably 0 to 10 kg/cm²G.

According to the process of the present invention, the catalytic activity of a deactivated catalyst can be restored to the level comparable to or higher than that of a fresh catalyst by the use of an inexpensive halogen or halogen-containing compound by means of decoking treatment followed by liquid-phase halogen contact treatment.

Hence, the regeneration process of the present invention is expected to find effective use in the industrial fields of petroleum refinery, petrochemistry and so forth.

In the following, the present invention will be described in further detail with reference to reference examples, non-limitative examples and comparative examples.

REFERENCE EXAMPLE 1 (PREPARATION OF THE CATALYST AND EVALUATION FOR ITS PERFORMANCE)

To 100 parts by weight of L-type zeolite (produced by Toso Co., Ltd. under the brand "TSZ-500 KOA") was added 20 parts by weight of silica binder (produced by Nissan Chemical Industries Ltd. under the brand "Snowtex"), followed by kneading and molding. Subsequently the molding was calcined in the air at 500° C. for 2 hours to produce L-type zeolite molded with silica binder, which was packed into a tubular reactor made of quartz and maintained at 200° C. for 30 minutes, while passing a stream of nitrogen through the reactor. Thereafter the nitrogen was replaced by monochlorotrifluoromethane gas and the temperature in the reactor was raised to 500° C., which was maintained for 2 hours. Then the monochlorotrifluoromethane gas was replaced by nitrogen again, while the temperature was lowered to obtain halogen treated L-type zeolite.

Next, 0.342 g of platinum tetramine chloride was dissolved in 10 g of deionized water to prepare an impregnating solution, which was gradually added dropwise to 20 g of the above-obtained halogen treated L-type zeolite under stirring to allow it to support the platinum component. After drying overnight at room temperature, the platinum supported on halogen treated L-type zeolite was dried in the air at 80° C. for 3 hours to obtain Catalyst A1.

The Catalyst A1 thus obtained was sieved to 16 to 32 mesh in an amount of 0.25 g, introduced in the tubular reactor made of quartz, while placing quartz sand on the upper and lower sides of the Catalyst A1, and treated at 540° C. for 24 hours in a stream of hydrogen.

Then, a mixture of light naphtha having a composition by weight of n-hexane/isohexane/methylcyclopentane being 60/26/14 and hydrogen was adjusted to 5 kg/cm²G and 517° C. and fed in the reactor at a weight hourly space velocity of 16 hr$^{-1}$ and a hydrogen/light-naphtha molar ratio of 5/1 to collect operational data for 20 hours after the start of feeding the mixture. The results obtained are given in Table 1.

REFERENCE EXAMPLE 2 (PREPARATION OF THE CATALYST)

To 100 parts by weight of L-type zeolite (produced by Toso Co., Ltd. under the brand "TSZ-500 KOA") was added 20 parts by weight of silica binder (produced by Nissan Chemical Industries Ltd. under the brand "Snowtex"), followed by kneading and molding. Subsequently the molding was calcined in the air at 500° C. for 2 hours to prepare L-type zeolite molded with silica binder.

Next, 0.17 g of platinum tetramine chloride was dissolved in 5.0 g of deionized water to prepare an impregnating solution, which was gradually added dropwise to 10 g of the above-obtained L-type zeolite molded with silica binder under stirring to allow it to support the platinum component. After drying overnight at room temperature, the platinum supported on L-type zeolite was dried in the air at 80° C. for 3 hours to obtain Catalyst A2.

REFERENCE EXAMPLE 3 (DEACTIVATION OF THE CATALYST)

Fresh Catalyst A1 that had been prepared in the above Reference Example 1 was packed into the tubular reactor and treated at 540° C. for 24 hours in a stream of hydrogen.

Then, a mixture of light naphtha having a composition by weight of desulfurized n-hexane/isohexane/methylcyclopentane being 60/26/14 and hydrogen was adjusted to 4 kg/cm$^2$G and 465° C. and fed in the reactor at a weight hourly space velocity of 4 hr$^{-1}$ and a hydrogen/light-naphtha molar ratio of 0.5/1 to deactivate the catalyst.

REFERENCE EXAMPLE 4 (DEACTIVATION OF THE CATALYST)

Fresh Catalyst A1 that had been prepared in the above Reference Example 1 was packed into the tubular reactor and treated at 540° C. for 24 hours in a stream of hydrogen.

Then, a mixture of light naphtha having a composition by weight of non-desulfurized n-hexane/isohexane/methylcyclopentane being 60/26/14 and hydrogen was adjusted to 5 kg/cm$^2$G and a prescribed temperature and fed in the reactor at a weight hourly space velocity of 2 hr$^{-1}$ and a hydrogen/light-naphtha molar ratio of 0.5/1 to deactivate the catalyst, while controlling the reaction so as to attain a benzene yield of 60% at the reactor outlet.

REFERENCE EXAMPLE 5 (DEACTIVATION OF THE CATALYST)

Fresh Catalyst A2 that had been prepared in the above Reference Example 2 was packed into the tubular reactor and treated at 540° C. for 24 hours in a stream of hydrogen.

Then, a mixture of light naphtha having a composition by weight of n-hexane/isohexane/methylcyclopentane being 60/26/14 and hydrogen was adjusted to 5 kg/cm$^2$G and 500° C. and fed in the reactor at a weight hourly space velocity of 2 hr$^{-1}$ and a hydrogen/light-naphtha molar ratio of 5/1 to deactivate the catalyst.

REFERENCE EXAMPLE 6

3 g of the catalyst that had been deactivated in the above Reference Example 3 was packed into the tubular reactor and treated at 540° C. for 24 hours in a stream of hydrogen to obtain Catalyst B1.

The Catalyst B1 thus obtained in an amount of 0.25 g was sieved to 16 to 32 mesh, fed in the reactor, while placing quartz sand on the upper and lower sides of the Catalyst B1, and treated at 540° C. for 24 hours in a stream of hydrogen.

Then, a mixture of light naphtha having a composition by weight of n-hexane/isohexane/methylcyclopentane being 60/26/14 and hydrogen was adjusted to 5 kg/cm$^2$G and 517° C. and fed in the reactor at a weight hourly space velocity of 16 hr$^{-1}$ and a hydrogen/light-naphtha molar ratio of 5/1 to collect operational data for 20 hours after the start of feeding the mixture. The results obtained are given in Table 1.

EXAMPLE 1

The catalyst B1 (2 g) was regenerated by impregnating it with a mixed solution of 0.284 g of 3.6% by weight of aqueous hydrogen chloride solution, 0.0195 g of ammonium fluoride and 0.8 g of deionized water, drying the impregnated catalyst at room temperature overnight and then calcining the same in the air at 120° C. and 300° C. each for 3 hours to obtain Catalyst C1.

The Catalyst C1 thus obtained in an amount of 0.25 g was sieved to 16 to 32 mesh, fed in the reactor, while placing quartz sand on the upper and lower sides of the Catalyst C1, and treated at 540° C. for 24 hours in a stream of hydrogen.

Then, a mixture of light naphtha having a composition by weight of n-hexane/isohexane/methylcyclopentane being 60/26/14 and hydrogen was adjusted to 5 kg/cm$^2$G and 517° C. and fed in the reactor at a weight hourly space velocity of 16 hr$^{-1}$ and a hydrogen/light-naphtha molar ratio of 5/1 to collect operational data for 20 hours after the start of feeding the mixture. The results obtained are given in Table 1.

EXAMPLE 2

The Catalyst B1 (2 g) was regenerated by impregnating it with a mixed solution of 0.0279 g of ammonium chloride, 0.0195 g of ammonium fluoride and 0.83 g of deionized water, drying the impregnated catalyst at room temperature overnight and then calcining the same in the air at 120° C. and 300° C. each for 3 hours to obtain Catalyst C2.

The Catalyst C2 thus obtained in an amount of 0.25 g was sieved to 16 to 32 mesh, fed in the reactor, while placing quartz sand on the upper and lower sides of the Catalyst C2, and treated at 540° C. fro 24 hours in a stream of hydrogen.

Then, a mixture of light naphtha having a compositon by weight of n-hexane/isohexane/methylcyclopentane being 60/26/14 and hydrogen was adjusted to 5 kg/cm$^2$G and 517° C. and fed in the reactor at a weight hourly space velocity of 16 hr$^{-1}$ and a hydrogen/light-naphtha molar ratio of 5/1 to collect operational data for 20 hours after the start of feeding the mixture. The results obtained are given in Table 1.

EXAMPLE 3

The catalyst B1 (3 g) was fed in the reactor and heated to raise the temperature to 300° C., which was maintained for one (1) hour, while a stream of nitrogen was passed through the reactor at a pressure of 7 kg/cm$^2$G and a flow rate of 120 cc/min. Thereafter, the stream of nitrogen was changed to a stream of a mixed gas having a composition by volume of O$_2$/N$_2$ being 0.25/99.75, and the catalyst in the reactor was heated to raise the temperature to 520° C. at a temperature rise rate of 50° C./min, maintained at 520° C. for one (1) hour and cooled to room temperature to obtain Catalyst B2.

The catalyst B (2 g) thus treated was regenerated by impregnating it with a mixed solution of 0.0279 g of ammonium chloride, 0.0195 g of ammonium fluoride and 0.83 g of deionized water, drying the impregnated catalyst at room temperature overnight and then calcining the same in the air at 120° C. and 400° C. each for 3 hours to obtain Catalyst C3.

The catalysts B2 and C3 thus obtained were evaluated in the same manner as in Example 1. The results are given in Table 1.

COMPARATIVE EXAMPLE 1

The catalyst B1 (3 g) was fed in the reactor, treated at 315° C. for one (1) hour subsequently at 415° C. for 5 hours in a stream of a mixed gas having a composition by volume of $O_2/N_2$ being 1.0/99.0 at a pressure of 0 kg/cm²G (atmospheric pressure) and a flow rate of 6 cc/min. Then the mixed gas was replaced by nitrogen gas, and the catalyst was cooled to room temperature and subjected to (1) treatment with deionized water in an excess amount of 10 times at 74° C. for 30 minutes, (2) cooling and (3) filtration. The above steps (1) to (3) were repeated three times.

After the above steps, the catalyst was subjected to (a) treatment with 0.1N sodium carbonate solution in an excess amount of 10 times at 57° C. for one (1) hour, (b) cooling and (c) filtration. The above steps (a) to (c) were repeated three times.

Next, the catalyst was subjected to (i) treatment with deionized water in an excess amount of 10 times at 57° C. for one (1) hours, (ii) cooling and (iii) filtration. The above steps (i) to (iii) were repeated three times.

Lastly, the catalyst was regenerated by air-drying at 121° C. for 2 hours and treating at 260° C. for 2 hours to obtain Catalyst C4.

The catalyst thus obtained was evaluated under the same testing conditions as in Example 1. The results are given in Table 1.

TABLE 1

| Catalyst No. | Conversion efficiency (% by weight) | $C_1$ to $C_5$ (% by weight) | Benzene (% by weight) |
|---|---|---|---|
| Catalyst A1 (fresh catalyst) | 64.3 | 3.7 | 60.6 |
| Catalyst B1 (hydrogen reduced catalyst) | 47.1 | 3.8 | 43.3 |
| Catalyst C1 (regenerated catalyst) | 65.0 | 4.0 | 61.0 |
| Catalyst C2 (regenerated catalyst) | 61.6 | 4.6 | 57.6 |
| Catalyst B2 (decoked catalyst) | 28.3 | 4.2 | 24.1 |
| Catalyst C3 (regenerated catalyst) | 66.2 | 4.1 | 62.1 |
| Catalyst C4 (regenerated catalyst) | 30.1 | 3.2 | 26.9 |

As can be seen from Table 1, the catalytic activity of a deactivated catalyst is not restored to the level comparable to a fresh catalyst by hydrogen reduction treatment along or decoking treatment, alone whereas it is restored to the level comparable or superior to a fresh catalyst by the combined application of the liquid-phase halogen contact treatment with the above hydrogen reduction or decoking treatment.

In Table 1, the conversion efficiency and the contents of $C_1$ to $C_5$ hydrocarbons and benzene were calculated from the following formulae:

$$\text{Conversion efficiency (\%)} = \frac{\text{weight of } C_6 \text{ hydrocarbon fed} - \text{weight of unreacted } C_6 \text{ hydrocarbon}}{\text{weight of } C_6 \text{ hydrocarbon fed}} \times 100$$

$$\frac{C_1 \text{ to } C_5}{(\% \text{ by weight})} = \frac{\text{weight of } C_1 \text{ to } C_5 \text{ hydrocarbon produced}}{\text{weight of } C_6 \text{ hydrocarbon fed}} \times 100$$

$$\frac{\text{Benzene}}{(\% \text{ by weigh})} = \frac{\text{weight of benzene produced}}{\text{weight of } C_6 \text{ hydrocarbon fed}} \times 100$$

EXAMPLE 4

The catalyst (10 g) which had been deactivated in the above Reference Example 4 was fed in the reactor and heated to raise the temperature from 120° C. to 520° C. at a temperature rise rate of 50° C./min, while a stream of a mixed gas having a composition by volume of $O_2/N_2$ being 0.33/99.67 was passed through the reactor at a pressure of 5 kg/cm²G and and a flow rate of 400 cc/min. The catalyst was maintained at 520° C. for 8 hours and cooled to room temperature to obtain Catalyst B3.

The catalyst B3 (2 g) thus treated was regenerated by impregnating it with a mixed solution of 0.0279 g of ammonium chloride, 0.0195 g of ammonium fluoride and 0.83 g of deionized water, drying the impregenated catalyst at room temperature overnight and then calcining the same in the air at 120° C. and 400° C. each for 3 hours to obtained Catalyst C5.

The catalyst C5 thus obtained was evaluated in the same manner as in Example 1. The results are given in Table 2.

EXAMPLE 5

The catalyst B3 (2 g) thus treated was regenerated by impregnating it with a mixed solution of 0.0279 g of ammonium chloride, 0.0195 g of ammonium fluoride and 0.83 g of deionized water drying the impregnated catalyst at room temperature overnight and then calcining the same in the air at 120° C. and 500° C. each for 3 hours to obtain Catalyst C6.

The catalyst C6 thus obtained was evaluated in the same manner as in Example 1. The results are given in Table 2.

EXAMPLE 6

The catalyst B3 (2 g) thus treated was regenerated by impregenating it with a mixed solution of 0.0279 g of ammonium chloride, 0.039 of ammonium fluoride and 0.83 g of deionized water, drying the impregenated catalyst at room temperature overnight and then calcining the same in the air at 120° C. and 400° C. each for 3 hours ot obtain Catalyst C7.

The catalyst C7 thus obtained was evaluated in th same manner as in Exmple 1. The results are given in Table 2.

COMPARATIVE EXAMPLE 2

The catalyst as obtained in Reference Example 4 was regenerated in the same manner as in Comparative Example 1 to obtain Catalyst C8, which was evaluated in the same manner as Example 1. The results are given in Table 2.

TABLE 2

| Catalyst No. | Conversion efficiency (% by weight) | $C_1$ to $C_5$ (% by weight) | Benzene (% by weight) |
|---|---|---|---|
| Catalyst A1 (fresh catalyst) | 64.3 | 3.7 | 60.6 |
| Catalyst B3 (decoked catalyst) | 8.6 | 2.5 | 6.1 |
| Catalyst C5 (regenerated catalyst) | 61.4 | 3.1 | 58.3 |
| Catalyst C6 (regenerated catalyst) | 60.8 | 3.4 | 57.4 |
| Catalyst C7 (regenerated catalyst) | 63.1 | 3.8 | 59.2 |
| Catalyst C8 (regenerated catalyst) | 17.8 | 4.6 | 13.2 |

In Table 2, the conversion efficiency and the contents of $C_1$ to $C_5$ hydrocarbons and benzene were calculated in the same manner as in Table 1.

EXAMPLE 7

The catalyst (3 g) which had been deactivated in the above Reference Example 5 was fed in the reactor and oxidized with 2% oxygen in nitrogen at a pressure of 0 kg/cm$^2$G (atmospheric pressure) at temperatures of 300°, 400° and 500° C., respectively each for one (1) hour, and then cooled to room temperature to obtain Catalyst B4.

The catalyst B4 (2 g) thus treated was regenerated by impregnating it with a mixed solution of 0.284 g of 3.6% by weight aqueous hydrogen chloride solution, 0.0195 g of ammonium fluoride and 0.8 g of deionized water, drying the impregnated catalyst at room temperature overnight and then calcining the same in the air at 120° C. and 400° C. each for 3 hours to obtain Catalyst C9.

The catalyst A2, B4 and C9 thus obtained were evaluated in the same manner as in Example 1. The results are given in Table 3.

TABLE 3

| Catalyst No. | Conversion efficiency (% by weight) | $C_1$ to $C_5$ (% by weight) | Benzene (% by weight) |
|---|---|---|---|
| Catalyst A2 (fresh catalyst) | 28.9 | 2.7 | 26.2 |
| Catalyst B4 (decoked catalyst) | 10.1 | 2.0 | 8.0 |
| Catalyst C9 (regenerated catalyst) | 43.7 | 2.4 | 41.3 |

In Table 3, the conversion efficiency and the contents of $C_1$ to $C_5$ hydrocarbons and benzene were calculated in the same manner as in Table 1.

What is claimed is:

1. A process for regenerating a deactivated catalyst, said catalyst containing a zeolite and a noble metal or group VIII of the Periodic Table supported thereon, said process comprising:
   (a) subjecting said deactivated catalyst to a decoking treatment under a reductive or an oxidation condition and subsequently to a contact treatment with an impregnation solution containing a mixture of $NH_4Cl$ and $NH_4F$ or a mixture of HCl and $NH_4F$ in an amount an amount of 0.1 to 10% by weight based on the amount of catalyst nd thereafter
   (b) calcining said deactivated catalyst at a temperature of 100° to 600° C. for a period of time of 0.5 to 24 hours and at a pressure of 0 to 20 kg/cm$^2$G.

2. The process according to claim 1 wherein the deactivated catalyst is a catalyst that is deactivated in the production of an aromatic compound.

3. The process according to claim 1 wherein the noble metal is Os, Ru, Rh, Ir, Pd or Pt.

4. The process according to claim 1 wherein the zeolite is X-type, Y-type, L-type, mordenite-type or ZSM-5 type.

5. The process according to claim 1 wherein the zeolite is made into formed particles with a binder selected from the group consisting of silica, alumina, silica-alumina, and clay.

6. The process according to claim 1 wherein the decoking treatment is effected under a reductive condition.

7. The process according to claim 1 wherein the decoking treatment is effected under an oxidative condition.

8. The process according to claim 1 wherein the contact treatment is effected by atmospheric-pressure impregnation, vacuum impregnation or permeation.

9. The process according to claim 1 wherein the calcining is effected in the presence of oxygen at a temperature from 200° to 500° C., a pressure from 0 to 10 kg/cm$^2$G for 1 to 10 hours.

10. The process according to claim 1 wherein the solution contains a solvent and said solvent being deionized water.

11. The process according to claim 3 wherein the zeolite is selected from the group consisting of X-type, Y-type, L-type, mordenite-type and ZSM-5 type.

12. The process according to claim 11 wherein the amount of said mixture of $NH_4Cl$ and $NH_4F$ or said mixture of HCl and $NH_4F$ is 0.5 to 5% by weight.

13. The process according to claim 12 wherein the calcining is carried out at a temperature of 200° to 500° C., for a time of 1 to 10 hours and at a pressure of 0 to 10 kg/cm$^2$G.

14. The process according to claim 13 wherein the decoking is carried out under reductive conditions in the presence of hydrogen, at a temperature of 200° to 600° C., for a time of 1 to 50 hours and at a pressure of 0 to 20 kg/cm$^2$G.

15. The process according to claim 14 wherein the decoking is carried out under reductive conditions at a temperature of 300° to 550° C., for a period of time of 10 to 30 hours and at a pressure of 0 to 10 kg/cm$^2$G.

16. The process according to claim 13 wherein the decoking is carried out under oxidative conditions in the presence of oxygen, at a temperature of 100° to 600°

C., for a time of 1 to 48 hours and at a pressure of 0 to 20 kg/cm$^2$G.

17. The process according to claim 16 wherein the decoking is carried out at a temperature of 100° to 550° C. for a time of 2 to 30 hours and at a pressure of 0 to 10 kg/cm$^2$G.

18. The process according to claim 13 wherein the zeolite is L-type zeolite and the group VIII noble metal is platinum.

* * * * *